US012512471B2

United States Patent
Li et al.

(10) Patent No.: US 12,512,471 B2
(45) Date of Patent: Dec. 30, 2025

(54) POSITIVE ELECTROACTIVE MATERIALS FOR ALL-SOLID-STATE BATTERY

(71) Applicant: GM GLOBAL TECHNOLOGY OPERATIONS LLC, Detroit, MI (US)

(72) Inventors: Zhe Li, Shanghai (CN); Qili Su, Shanghai (CN); Yong Lu, Shanghai (CN); Haijing Liu, Shanghai (CN); Lianqi Zhang, Tianjin (CN); Yiming Sun, Tianjin (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 515 days.

(21) Appl. No.: 18/074,784

(22) Filed: Dec. 5, 2022

(65) Prior Publication Data

US 2024/0021809 A1    Jan. 18, 2024

(30) Foreign Application Priority Data

Jul. 12, 2022 (CN) .......................... 202210816113.3

(51) Int. Cl.
   *H01M 4/525* (2010.01)
   *H01M 4/02* (2006.01)
   (Continued)

(52) U.S. Cl.
   CPC .......... *H01M 4/525* (2013.01); *H01M 4/366* (2013.01); *H01M 4/62* (2013.01);
   (Continued)

(58) Field of Classification Search
   CPC ...................................... H01M 4/525
   See application file for complete search history.

(56) References Cited

U.S. PATENT DOCUMENTS

| 10,714,756 B2 | 7/2020 | Dai et al. |
| 11,121,375 B2 | 9/2021 | Hou et al. |

(Continued)

FOREIGN PATENT DOCUMENTS

| CN | 107968202 B | * 12/2020 | ............ H01M 4/505 |
| CN | 117438545 A | 1/2024 | |
| DE | 102022130524 A1 | 1/2024 | |

OTHER PUBLICATIONS

Raimund Koerver et al.; "Capacity Fade in Solid-State Batteries: Interphase Formation and Chemomechanical Processes in Nickel-Rich Layered Oxide Cathodes and Lithium Thiophosphate Solid Electrolytes"; Chemistry of Materials; Jun. 9, 2017; pp. 5574-5582.

(Continued)

*Primary Examiner* — Brian R Ohara
(74) *Attorney, Agent, or Firm* — Harness, Dickey & Pierce, P.L.C.

(57) ABSTRACT

The present disclosure provides a positive electroactive material for an electrochemical cell that cycles lithium ions. The positive electroactive material includes a nickel-rich material including a plurality of solid-state particles. Each solid-state particle has a heterogeneous structure that includes a core and a shell that at least partially coats the core. The core includes a nickel-cobalt-manganese material, and the shell includes a nickel-cobalt-aluminum material. When the nickel-rich material is represented by $LiNi_{(1-x-y-z)}Co_xMn_yAl_zO_2$, the nickel-cobalt-manganese material is represented by $LiNi_{(i-x''-(y/a))}Co_{x''}Mn_{(y/a)}O_2$, and the nickel-cobalt-aluminum material is represented by $LiNi_{(i-x''-(z/b))}Co_{x''}Al_{(z/b)}O_2$, where (i) $1-x-y-z > 0.5$, (ii) $a+b=1$, (iii) $zx''+bx''=x$, and (iv) $1-x''-(y/a) > 1-x''-(z/b)$. In certain variations, the core and the shell define a base structure, and the heterogeneous structure further includes a buffer layer that at least partially coats the base structure.

18 Claims, 7 Drawing Sheets

(51) Int. Cl.
*H01M 4/36* (2006.01)
*H01M 4/62* (2006.01)
*H01M 10/0525* (2010.01)
*H01M 10/0562* (2010.01)

(52) U.S. Cl.
CPC ... *H01M 10/0525* (2013.01); *H01M 10/0562* (2013.01); *H01M 2004/021* (2013.01); *H01M 2004/028* (2013.01); *H01M 2300/0068* (2013.01)

(56) References Cited

U.S. PATENT DOCUMENTS

| | | | |
|---|---|---|---|
| 11,145,922 | B2 | 10/2021 | Li et al. |
| 11,205,798 | B2 | 12/2021 | Li et al. |
| 11,217,826 | B2 | 1/2022 | Li et al. |
| 11,295,901 | B2 | 4/2022 | Hou et al. |
| 11,374,257 | B2 | 6/2022 | Hou et al. |
| 11,404,714 | B2 | 8/2022 | Hou et al. |
| 11,824,159 | B2 | 11/2023 | Li et al. |
| 11,967,722 | B2 | 4/2024 | Su et al. |
| 2017/0062871 | A1* | 3/2017 | Urata ............... H01M 4/525 |
| 2017/0317344 | A1* | 11/2017 | Tan ............... H01M 10/0525 |
| 2018/0079655 | A1* | 3/2018 | Dai ............... H01M 4/505 |
| 2020/0403267 | A1 | 12/2020 | Li et al. |
| 2021/0020929 | A1 | 1/2021 | Kong et al. |
| 2021/0036310 | A1 | 2/2021 | Hou et al. |
| 2021/0036360 | A1 | 2/2021 | Li et al. |
| 2021/0050596 | A1 | 2/2021 | Li et al. |
| 2021/0057776 | A1 | 2/2021 | Lu et al. |
| 2021/0111426 | A1 | 4/2021 | Li et al. |
| 2021/0135224 | A1 | 5/2021 | Hou et al. |
| 2022/0102756 | A1 | 3/2022 | Frieberg et al. |
| 2022/0123352 | A1 | 4/2022 | Li et al. |
| 2022/0140422 | A1 | 5/2022 | Chen et al. |
| 2022/0166031 | A1 | 5/2022 | Li et al. |
| 2022/0181598 | A1 | 6/2022 | Lu et al. |
| 2022/0181685 | A1 | 6/2022 | Li et al. |
| 2022/0255130 | A1 | 8/2022 | Frieberg |
| 2022/0263055 | A1 | 8/2022 | Hou et al. |
| 2022/0263129 | A1 | 8/2022 | Lu et al. |
| 2022/0302526 | A1 | 9/2022 | Li et al. |
| 2022/0407079 | A1 | 12/2022 | Lu et al. |
| 2023/0015143 | A1 | 1/2023 | Su et al. |
| 2023/0024667 | A1 | 1/2023 | Li et al. |
| 2023/0025830 | A1 | 1/2023 | Su et al. |
| 2023/0046608 | A1 | 2/2023 | Su et al. |
| 2023/0378440 | A1* | 11/2023 | Mahbub ............... C01G 53/50 |

OTHER PUBLICATIONS

Yizhou Zhu et al.; "First Principles Study on Electrochemical and Chemical Stability of Solid Electrolyte-Electrode Interfaces in All-Solid-State Li-Ion Batteries"; Journal of Materials Chemistry A, vol. 4, No. 9; (2016); pp. 3253-3266.

Qili Su et al.; U.S. Appl. No. 17/688,445, filed Mar. 7, 2022, entitled "Methods of Fabricating Bipolar Solid State Batteries"; 77 pages.

Qili su et al.; U.S. Appl. No. 17/697,135, filed Mar. 17, 2022, entitled "Methods of Manufacturing Bipolar Solid-State Batteries"; 77 pages.

Qi Lu et al.; U.S. Appl. No. 17/698,865, filed Mar. 18, 2022, entitled "Bipolar Current Collector and Method of Making the Same"; 48 pages.

Zhe Li et al.; U.S. Appl. No. 17/707,524, filed Mar. 29, 2022, entitled "Argyrodite Solid Electrolytes for Solid-State Batteries and Methods of Making the Same"; 56 pages.

Qili Su et al.; U.S. Appl. No. 17/710,900, filed Mar. 31, 2022, entitled "Gel Electrolyte System for Solid State Battery"; 76 pages.

Qili Su et al.; U.S. Appl. No. 17/560,673, filed Dec. 23, 2021, entitled "Folded Bipolar Battery Design"; 45 pages.

Zhe Li et al.; U.S. Appl. No. 17/458,903, filed Aug. 27, 2021, entitled "Anode-Free Solid-State Battery and Method of Battery Fabrication"; 28 pages.

* cited by examiner

POSITIVE ELECTROACTIVE MATERIALS FOR ALL-SOLID-STATE BATTERY

CROSS-REFERENCE TO RELATED APPLICATIONS

This application claims the benefit and priority of Chinese Application No. 202210816113.3, filed Jul. 12, 2022. The entire disclosure of the above application is incorporated herein by reference.

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte layer may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte layer, the solid-state electrolyte layer may physically separate the electrodes so that a distinct separator is not required.

Many different materials may be used to create components for a lithium-ion battery. For example, in various aspects, positive electrodes include nickel-rich electroactive materials (e.g., greater than or equal to about 0.6 mole fraction on transition metal lattice), such as NMC ($LiNi_{1-x-y}Co_xMn_yO_2$) (where $0.01 \leq x \leq 0.33$, $0.01 \leq y \leq 0.33$) or NCMA ($LiNi_{1-x-y-z}Co_xMn_yAl_zO_2$) (where $0.02 \leq x \leq 0.20$, $0.01 \leq y \leq 0.12$, $0.01 \leq z \leq 0.08$), which are capable of providing improved capacity capability (e.g., greater than 200 mAh/g) while allowing for additional lithium extraction without compromising the structural stability of the positive electrode. Such materials, however, often have poor interfacial compatibility or stability with solid-state electrolytes, and in particular, sulfide electrolyte, including for example passivating interphase formation often caused by the decomposition of the solid electrolyte and contact loss caused by structure instabilities, which can result in capacity degradation and continuously increased resistance. Accordingly, it would be desirable to develop improved materials, and methods of making and using the same, that can address these challenges.

SUMMARY

This section provides a general summary of the disclosure, and is not a comprehensive disclosure of its full scope or all of its features.

The present disclosure relates to solid-state positive electroactive material particles having one or more coatings, and also, to all-solid-state electrochemical cells including the solid-state positive electroactive material particles, as well as methods of making and using the same.

In various aspects, the present disclosure provides a positive electroactive material for an electrochemical cell that cycles lithium ions. The positive electroactive material may include a nickel-rich material including a plurality of solid-state particles. Each solid-state particle may have a heterogeneous structure that includes a core and a shell that at least partially coats the core. The core may include a nickel-cobalt-manganese material. The shell may include a nickel-cobalt-aluminum material.

In one aspect, when the nickel-rich material is represented by $LiNi_{(1-x-y-z)}Co_xMn_yAl_zO_2$, the nickel-cobalt-manganese material may be represented by $LiNi_{(1-x''-(y/a))}Co_{x''}Mn_{(y/a)}O_2$, and the nickel-cobalt-aluminum material may be represented by $LiNi_{(1-x''-(z/b))}Co_{x''}Al_{(z/b)}O_2$, where (i) 1-x-y-z>0.5, (ii) a+b=1, (iii) zx''+bx''=x, and (iv) 1-x''-(y/a)>1-x''-(z/b).

In one aspect, the nickel-rich material may include $LiNi_{0.88}Co_{0.04}Mn_{0.05}Al_{0.02}O_2$, the nickel-cobalt-manganese material may include 0.8 $LiNi_{0.8975}Co_{0.04}Mn_{0.0625}O_2$, and the nickel-cobalt-aluminum material may include 0.2 $LiNi_{0.81}Co_{0.04}Al_{0.15}O_2$.

In one aspect, the shell may cover greater than or equal to about 80% to less than or equal to about 100% of an exposed surface of the core.

In one aspect, a mass ratio of the core to the shell may be greater than or equal to about 1:99 to less than or equal to about 99:1.

In one aspect, the core may have a particle size greater than or equal to about 0.1 μm to less than or equal to about 50 μm, and the shell may have an average thickness greater than or equal to about 0.01 μm to less than or equal to about 10 μm.

In one aspect, the core and the shell may define a base structure, and the heterogeneous structure may further include a buffer layer that at least partially coats the base structure.

In one aspect, the buffer layer may cover greater than or equal to about 50% to less than or equal to about 100% of the base structure.

In one aspect, the buffer layer may have an average thickness greater than or equal to about 0.001 μm to less than or equal to about 1 μm.

In one aspect, the buffer layer may include a material selected from the group consisting of: $LiNbO_3$, $Li_3PO_4$, $LiAlO_2$, $Al_2O_3$, $LiTaO_3$, $Li_4Ti_5O_{12}$, $Li_2SiO_3$, $Li_3BO_3$, $LiH_2PO_4$, $LiTi_2(PO_4)_3$, $LiPO_3$, $Li_2ZrO_3$, and combinations thereof.

In various aspects, the present disclosure provides an all-solid-state electrochemical cell that cycles lithium ions. The all-solid-state electrochemical cell may include a positive electrode that includes a sulfide-based solid-state electrolyte and a nickel-rich material. The nickel-rich material may include a plurality of solid-state electroactive material particles. Each solid-state particle may have a heterogeneous structure that includes a core and a shell that at least partially coats the core. The core may include a nickel-cobalt-manganese material. The shell may include a nickel-cobalt-aluminum material.

In one aspect, when the nickel-rich material is represented by $LiNi_{(1-x-y-z)}Co_xMn_yAl_zO_2$, the nickel-cobalt-manganese material may be represented by $LiNi_{(1-x''-(y/a))}Co_{x''}Mn_{(y/a)}O_2$, and the nickel-cobalt-aluminum material may be represented by $LiNi_{(1-x''-(z/b))}Co_{x''}Al_{(z/b)}O_2$, where (i) 1-x-y-z>0.5, (ii) a+b=1, (iii) zx''+bx''=x, and (iv) 1-x''-(y/a)>1-x''-(z/b).

In one aspect, a mass ratio of the core to the shell may be greater than or equal to about 1:99 to less than or equal to about 99:1. The shell may cover greater than or equal to about 60% to less than or equal to about 100% of an exposed surface of the core.

In one aspect, the core and the shell may define a base structure, and the heterogeneous structure may further include a buffer layer that at least partially coats the base structure.

In one aspect, the buffer layer may cover greater than or equal to about 50% to less than or equal to about 100% of the base structure.

In one aspect, the buffer layer may include a material selected from the group consisting of: $LiNbO_3$, $Li_3PO_4$, $LiAlO_2$, $Al_2O_3$, $LiTaO_3$, $Li_4Ti_5O_{12}$, $Li_2SiO_3$, $Li_3BO_3$, $LiH_2PO_4$, $LiTi_2(PO_4)_3$, $LiPO_3$, $Li_2ZrO_3$, and combinations thereof.

In various aspects, the present disclosure provides a solid-state positive electrode for an electrochemical cell that cycles lithium ions. The solid-state positive electrode may include a nickel-rich material represented by $LiNi_{(1-x-y-z)}Co_xMn_yAl_zO_2$. The nickel-rich material may include a plurality of solid-state particles. Each of the solid-state particles may include a core and a shell. The core may include a nickel-cobalt-manganese material represented by $LiNi_{(1-x''(y/a))}Co_xMn_{(y/a)}O_2$. The shell may include a nickel-cobalt-aluminum material represented by $LiNi_{(1-x'''(z/b))}Co_{x''}Al_{(z/b)}O_2$, where (i) 1-x-y-z>0.5, (ii) a+b=1, (iii) zx'+bx''=x, and (iv) 1-x'-(y/a)>1 x''-(z/b), The solid-state positive electrode may also include a sulfide-based solid-state electrolyte.

In one aspect, at least one particle of the plurality of solid-state particles may be coated with a buffer layer.

In one aspect, the buffer layer may cover greater than or equal to about 50% to less than or equal to about 100% of exposed surface of the particle.

In one aspect, the buffer layer may include a material selected from the group consisting of: $LiNbO_3$, $Li_3PO_4$, $LiAlO_2$, $Al_2O_3$, $LiTaO_3$, $Li_4Ti_5O_{12}$, $Li_2SiO_3$, $Li_3BO_3$, $LiH_2PO_4$, $LiTi_2(PO_4)_3$, $LiPO_3$, $Li_2ZrO_3$, and combinations thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawing.

The present technology relates to all-solid-state electrochemical cells including positive solid-state electroactive material particles having one or more coatings, as well as methods of making and using the same. Such cells may be incorporated into energy storage devices, like rechargeable lithium-ion batteries, which may be used in automotive transportation applications (e.g., motorcycles, boats, tractors, buses, mobile homes, campers, and tanks). The present technology, however, may also be used in other electrochemical devices, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. In various aspects, the present disclosure provides a rechargeable lithium-ion battery that exhibits high temperature tolerance, as well as improved safety and superior power capability and life performance.

In certain variations, batteries including all-solid-state electrochemical cells that are prepared in accordance with various aspects of the present disclosure may have a bipolar stacking design comprising a plurality of bipolar electrodes where a first mixture of electroactive material particles (and optional solid-state electrolyte particles) is disposed on a first side of a current collector, and a second mixture of electroactive material particles (and optional solid-state electrolyte particles) is disposed on a second side of a current collector that is parallel with the first side. The first mixture may include, as the electroactive material particles, cathode material particles having one or more coatings. The second mixture may include, as the electroactive material particles, anode material particles. The solid-state electrolyte particles in each instance may be the same or different.

In other variations, batteries including all-solid-state electrochemical cells that are prepared in accordance with various aspects of the present disclosure may have a monopolar stacking design comprising a plurality of monopolar electrodes where a first mixture of electroactive material particles (and optional solid-state electrolyte particles) is disposed on both a first side and a second side of a first current collector, wherein the first and second sides of the first current collector are substantially parallel, and a second mixture of electroactive material particles (and optional solid-state electrolyte particles) is disposed on both a first side and a second side of a second current collector, where the first and second sides of the second current collector are substantially parallel. The first mixture may include, as the electroactive material particles, cathode material particles having one or more coating. The second mixture may include, as electroactive material particles, anode material particles. The solid-state electrolyte particles in each instance may be the same or different. In certain variations, the batteries may include a mixture of combination of bipolar and monopolar stacking designs.

Figure 1:
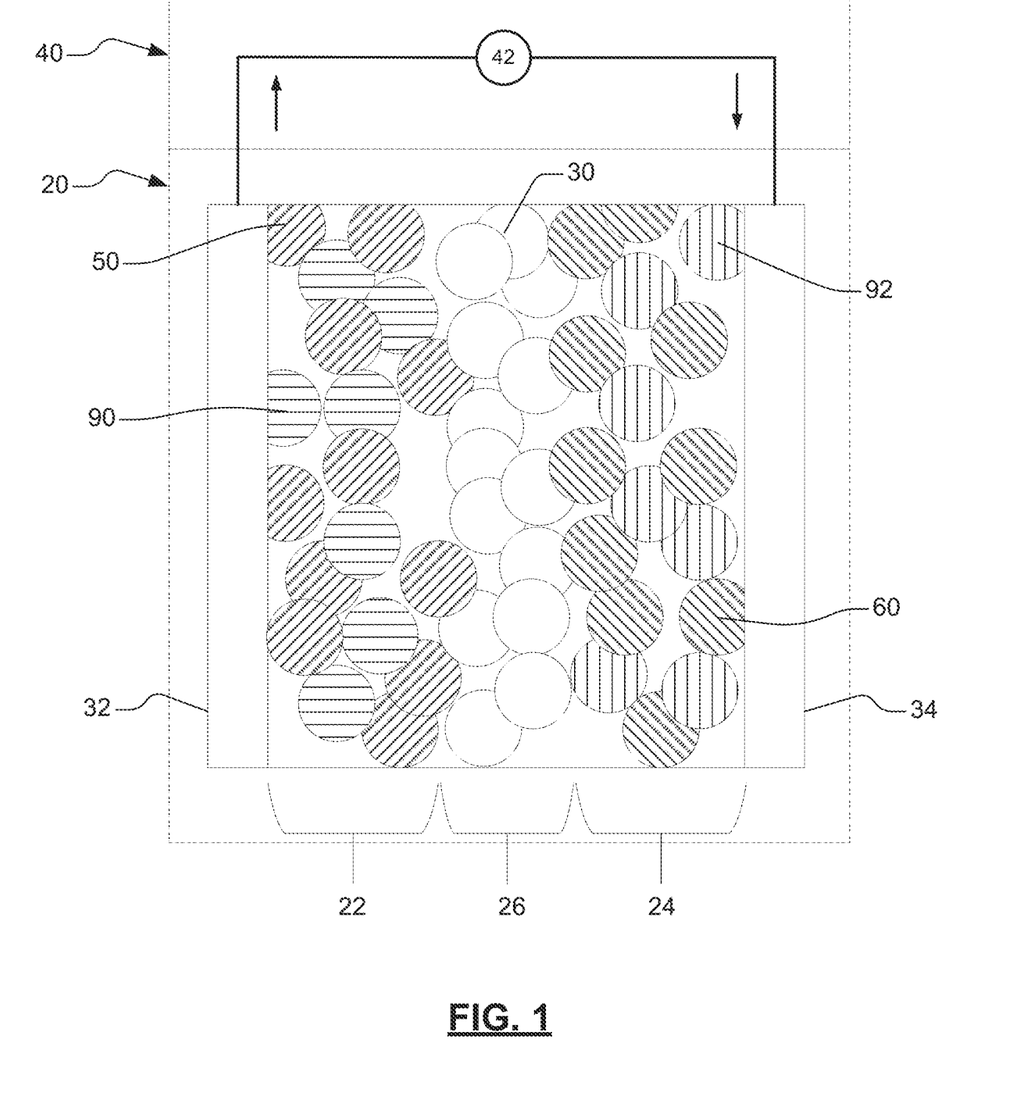
FIG. 1 is an illustration of an example all-solid-state electrochemical cell including a positive solid-state electroactive material particle have one or more coatings in accordance with various aspects of the present disclosure.

An exemplary and schematic illustration of a solid-state electrochemical cell (also referred to as a "all-solid-state battery" and/or "solid-state battery" and/or "battery") 20 that cycles lithium ions is shown in FIG. 1. The battery 20 includes a negative electrode (i.e., anode) 22, a positive electrode (i.e., cathode) 24, and an electrolyte layer 26 that occupies a space defined between the electrodes. The electrolyte layer 26 is a solid-state separating layer that physically separates the negative electrode 22 from the positive electrode 24. The electrolyte layer 26 may include a first plurality of solid-state electrolyte particles 30. The electrolyte layer 26 may include a first plurality of solid-state electrolyte particles 30. A second plurality of solid-state electrolyte particles 90 may be mixed with negative solid-state electroactive particles 50 in the negative electrode 22, and a third plurality of solid-state electrolyte particles 92 may be mixed with positive solid-state electroactive particles 60 in the positive electrode 24, so as to form a continuous electrolyte network.

A first current collector 32 may be positioned at or near the negative electrode 22. In certain instances, the first current collector 32 together with the negative electrode 22 may be referred to as a negative electrode assembly. The first current collector 32 may be a metal foil, metal grid or screen, or expanded metal comprising copper, stainless steel, nickel, iron, titanium, or any other appropriate electrically conductive material known to those of skill in the art. In certain variations, the first current collector 32 may be coated foil having improved corrosion resistance, such as graphene or carbon coated stainless steel foil. The first current collector 32 may have an average thickness greater than or equal to about or exactly 2 μm to less than or equal to about or exactly 30 μm.

A second current collector 34 may be positioned at or near the positive electrode 24. In certain instances, the second current collector 34 together with the positive electrode 24 may be referred to as a positive electrode assembly. The second current collector 34 may be a metal foil, metal grid or screen, or expanded metal comprising stainless steel, aluminum, nickel, iron, titanium, or any other appropriate electrically conductive material known to those of skill in the art. In certain variations, the second current collector 34 may be coated foil having improved corrosion resistance, such as graphene or carbon coated stainless steel foil. The second current collector 34 may have an average thickness greater than or equal to about or exactly 2 μm to less than or equal to about or exactly 30 μm.

Although not illustrated, the skilled artisan will recognize that in certain variations, the first current collector 32 may be a first bipolar current collector and/or the second current collector 34 may be a second bipolar current collector. For example, the first bipolar current collector 32 and/or the second bipolar current collector 34 may be a cladded foil, for example, where one side (e.g., the first side or the second side) of the current collector 32, 34 includes one metal (e.g., first metal) and another side (e.g., the other side of the first side or the second side) of the current collector 32 includes another metal (e.g., second metal). The cladded foil may include, for example only, aluminum-copper (Al—Cu), nickel-copper (Ni—Cu), stainless steel-copper (SS-Cu), aluminum-nickel (Al—Ni), aluminum-stainless steel (Al-SS), or nickel-stainless steel (Ni-SS). In certain variations, the first bipolar current collector 32 and/or second bipolar current collectors 34 may be pre-coated, such as graphene or carbon-coated aluminum current collectors.

The first current collector 32 and the second current collector 34 may be the same or different. In each instance, however, the first current collector 32 and the second electrode current collector 34 respectively collect and move free electrons to and from an external circuit 40. For example, an interruptible external circuit 40 and a load device 42 may connect the negative electrode 22 (through the first current collector 32) and the positive electrode 24 (through the second current collector 34). The battery 20 can generate an electric current (indicated by arrows in FIG. 1) during discharge by way of reversible electrochemical reactions that occur when the external circuit 40 is closed (to connect the negative electrode 22 and the positive electrode 24) and when the negative electrode 22 has a lower potential than the positive electrode 24. The chemical potential difference between the negative electrode 22 and the positive electrode 24 drives electrons produced by a reaction, for example, the oxidation of intercalated lithium, at the negative electrode 22, through the external circuit 40 towards the positive electrode 24. Lithium ions, which are also produced at the negative electrode 22, are concurrently transferred through the electrolyte layer 26 towards the positive electrode 24. The electrons flow through the external circuit 40 and the lithium ions migrate across the electrolyte layer 26 to the positive electrode 24, where they may be plated, reacted, or intercalated. The electric current passing through the external circuit 40 can be harnessed and directed through the load device 42 (in the direction of the arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. The connection of the external power source to the battery 20 promotes a reaction, for example, non-spontaneous oxidation of intercalated lithium, at the positive electrode 24 so that electrons and lithium ions are produced. The electrons, which flow back towards the negative electrode 22 through the external circuit 40, and the lithium ions, which move across the electrolyte layer 26 back towards the negative electrode 22, reunite at the negative electrode 22 and replenish it with lithium for consumption during the next battery discharge cycle. As such, a complete discharging event followed by a complete charging event is considered to be a cycle, where lithium ions are cycled between the positive electrode 24 and the negative electrode 22.

Although the illustrated example includes a single positive electrode 24 and a single negative electrode 22, the skilled artisan will recognize that the current teachings apply to various other configurations, including those having one or more cathodes and one or more anodes, as well as various current collectors and current collector films with electroactive particle layers disposed on or adjacent to or embedded within one or more surfaces thereof. Likewise, it should be recognized that the battery 20 may include a variety of other components that, while not depicted here, are nonetheless known to those of skill in the art. For example, the battery 20 may include a casing, a gasket, terminal caps, and any other conventional components or materials that may be situated within the battery 20, including between or around the negative electrode 22, the positive electrode 24, and/or the electrolyte 26 layer.

In many configurations, each of the first current collector 32, the negative electrode 22, the electrolyte layer 26, the positive electrode 24, and the second current collector 34 are prepared as relatively thin layers (for example, from several microns to a millimeter or less in thickness) and assembled in layers connected in series arrangement to provide a suitable electrical energy, battery voltage and power package, for example, to yield a Series-Connected Elementary Cell Core ("SECC"). In various other instances, the battery 20 may further include electrodes 22, 24 connected in parallel to provide suitable electrical energy, battery voltage, and power for example, to yield a Parallel-Connected Elementary Cell Core ("PECC").

The size and shape of the battery 20 may vary depending on the particular applications for which it is designed. Battery-powered vehicles and hand-held consumer electronic devices are two examples where the battery 20 would most likely be designed to different size, capacity, voltage, energy, and power-output specifications. The battery 20 may also be connected in series or parallel with other similar lithium-ion cells or batteries to produce a greater voltage output, energy, and power if it is required by the load device 42. The battery 20 can generate an electric current to the load device 42 that can be operatively connected to the external circuit 40. The load device 42 may be fully or partially powered by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be an electricity-generating apparatus that charges the battery 20 for purposes of storing electrical energy.

With renewed reference to FIG. 1, as introduced above, the electrolyte layer 26 provides electrical separation-preventing physical contact-between the negative electrode 22 and the positive electrode 24. The electrolyte layer 26 also provides a minimal resistance path for internal passage of ions. The electrolyte layer 26 may have an average thickness greater than or equal to about or exactly 1 μm to less than or equal to about or exactly 1,000 μm, optionally greater than or equal to about or exactly 5 μm to less than or equal to about or exactly 200 μm, optionally greater than or equal to about or exactly 10 μm to less than or equal to about or exactly 100 μm, optionally about or exactly 20 μm, and in certain aspects, optionally about or exactly 15 μm.

In various aspects, the electrolyte layer 26 may be defined by a first plurality of solid-state electrolyte particles 30. For example, the electrolyte layer 26 may be in the form of a layer or a composite that comprises the first plurality of solid-state electrolyte particles 30. The solid-state electrolyte particles 30 may have an average particle diameter greater than or equal to about or exactly 0.02 μm to less than or equal to about or exactly 20 μm, optionally greater than or equal to about or exactly 0.1 μm to less than or equal to about or exactly 10 μm, and in certain aspects, optionally greater than or equal to about or exactly 0.1 μm to less than or equal to about or exactly 5 μm. For example, in certain variations, the solid-state electrolyte particles may include sulfide-based particles, hydride-based particles, halide-based particles, and/or other solid-state electrolyte particles having a low grain-boundary resistance (e.g., less than or equal to about or exactly 20 ohms at about or exactly 25° C.).

The sulfide-based particles may include, for example only, pseudobinary sulfides, pseudoternary sulfides, and/or pseudoquaternary sulfides. Example pseudobinary sulfide systems include $Li_2S$—$P_2S_5$ systems (such as, $Li_3PS_4$, $Li_7P_3S_{11}$, and $Li_{9.6}P_3S_{12}$), $Li_2S$—$SnS_2$ systems (such as, $Li_4SnS_4$), $Li_2S$—$SiS_2$ systems, $Li_2S$—$GeS_2$ systems, $Li_2S$—$B_2S_3$ systems, $Li_2S$—$Ga_2S_3$ system, $Li_2S$—$P_2S_3$ systems, and $Li_2S$—$Al_2S_3$ systems. Example pseudoternary sulfide systems include $Li_2O$—$Li_2S$—$P_2S_5$ systems, $Li_2S$—$P_2S_5$—$P_2O_5$ systems, $Li_2S$—$P_2S_5$—$GeS_2$ systems (such as, $Li_{3.25}Ge_{0.25}P_{0.75}S_4$ and $Li_{10}GeP_2Si_2$), $Li_2S$—$P_2S_5$—LiX systems (where X is one of F, Cl, Br, and I) (such as, $Li_6PS_5Br$, $Li_6PS_5Cl$, $L_7P_2S_8I$, and $Li_4PS_4I$), $Li_2S$—$As_2S_5$—$SnS_2$ systems (such as, $Li_{3.833}Sn_{0.833}As_{0.166}S_4$), $Li_2S$—$P_2S_5$—$Al_2S_3$ systems, $Li_2S$—LiX—$SiS_2$ systems (where X is one of F, Cl, Br, and I), $0.4LiI·0.6Li_4SnS_4$, and $Li_{11}Si_2PS_{12}$. Example pseudoquaternary sulfide systems include $Li_2O$—$Li_2S$—$P_2S_5$—$P_2O_5$ systems, $Li_{9.54}Si_{1.74}P_{1.44}S_{11.7}Cl_{0.3}$, $Li_7P_{2.9}Mn_{0.1}S_{10.7}I_{0.3}$, and $Li_{10.35}[Sn_{0.27}Si_{1.08}]P_{1.65}S_{12}$. The halide-based particles may include, for example only, $Li_3YCl_6$, $Li_3InCl_6$, $Li_3YBr_6$, LiI, $Li_2CdCl_4$, $Li_2MgCl_4$, $LiCdI_4$, $Li_2ZnI_4$, $Li_3OCl$, and combinations thereof. The hydride-based particles may include, for example only, $LiBH_4$, $LiBH_4$—LiX (where X=Cl, Br, or I), $LiNH_2$, $Li_2NH$, $LiBH_4$—$LiNH_2$, $Li_3AlH_6$, and combinations thereof.

Although not illustrated, it should be recognized that in certain instances the solid-state electrolyte layer 26 further includes a filler and/or a polymeric binder. For example, the solid-state electrolyte layer 26 may include greater than or equal to about 20 wt. % to less than or equal to about 100 wt. %, and in certain aspects, optionally greater than or equal to about 80 wt. % to less than or equal to about 100 wt. %, of the solid-state electrolyte particles 30; greater than or equal to about 0 wt. % to less than or equal to about 30 wt. %, and in certain aspects, optionally greater than or equal to about 0 wt. % to less than or equal to about 10 wt. %, of the filler; and greater than or equal to about 0 wt. % to less than or equal to about 20 wt. %, and in certain aspects, optionally greater than or equal to about 0 wt. % to less than or equal to about 10 wt. %, of the polymeric binder.

Example fillers include oxide particles (e.g., $SiO_2$, $Al_2O_3$, $TiO_2$, $ZrO_2$), polymeric framework additives (e.g., polypropylene (PP), polyethylene (PE)), and/or lithium salts (e.g., lithium bis(trifluoromethanesulfonyl)imide (LiTFSI), lithium tetrafluoroborate ($LiBF_4$)). Example polymeric binders include polyimide, polyamic acid, polyamide, polysulfone, polyvinylidene difluoride (PVdF), poly(vinylidene fluoride-co-hexafluoropropylene) (PVdF-HFP), polytetrafluoroethylene (PTFE), polyacrylic acid, blends of polyvinylidene fluoride and polyhexafluoropropene, polychlorotrifluoroethylene, ethylene propylene diene monomer (EPDM) rubber, carboxymethyl cellulose (CMC), a nitrile butadiene rubber (NBR), styrene-butadiene rubber (SBR), lithium polyacrylate (LiPAA), sodium polyacrylate (NaPAA), styrene butylene styrene copolymer (SEBS), sodium alginate, lithium alginate, poly(ethylene oxide) (PEO), polyvinylpyrrolidone (PVP), poly(vinyl alcohol), poly(acrylic acid) (PAA), and combinations thereof.

As illustrated, the negative electrode 22 may be defined by a plurality of the negative solid-state electroactive particles 50. In certain instances, as illustrated, the negative electrode 22 may be a composite layer including, for example, the negative solid-state electroactive particles 50 and a second plurality of solid-state electrolyte particles 90. For example, the negative electrode 22 may include greater than or equal to about 30 wt. % to less than or equal to about 98 wt. %, and in certain aspects, optionally greater than or equal to about 50 wt. % to less than or equal to about 95 wt. %, of the negative solid-state electroactive particles 50; and greater than or equal to about 0 wt. % to less than or equal to about 50 wt. %, and in certain aspects, optionally greater than or equal to about 5 wt. % to less than or equal to about 20 wt. %, of the second plurality of solid-state electrolyte particles 90. In each variation, the negative electrode 22 may have a thickness greater than or equal to about 10 μm to less than or equal to about 400 μm, and in certain aspects, optionally greater than or equal to about 30 μm to less than or equal to about 200 μm.

The second plurality of solid-state electrolyte particles 90 may be the same as or different from the first plurality of solid-state electrolyte particles 30. The negative solid-state electroactive particles 50 may be formed from a lithium host material that is capable of functioning as a negative terminal of a lithium-ion battery. For example, in certain variations, the negative solid-state electroactive particles 50 may be lithium-based, for example, a lithium alloy (e.g., $Li_4Ti_5O_{12}$). In other variations, the negative solid-state electroactive particles 50 may include, for example only, carbonaceous materials (such as, graphite, hard carbon, soft carbon, and the like) and/or metallic active materials (such as tin, aluminum, magnesium, germanium, and alloys thereof, and the like). In still other variations, the negative solid-state electroactive particles 40 may include a metal oxides and/or sulfides, such as $TiO_2$, Fe, and the like. In further variations, the negative electrode 22 may include a silicon-based electroactive material. In still further variations, the negative electrode 22 may include a combination of negative electroactive materials. For example, the negative electrode 22 may include a combination of the silicon-based electroactive material (i.e., first negative electroactive material) and one or more other negative electroactive materials. The one or more other negative electroactive materials may include, for example only, carbonaceous materials (such as, graphite, hard carbon, soft carbon, and the like) and/or metallic active materials (such as tin, aluminum, magnesium, germanium, and alloys thereof, and the like).

Although not illustrated, it should be recognized that in certain variations, the negative solid-state electroactive material particles 50 (and the optional second plurality of solid-state electrolyte particles 90) may be intermingled (e.g., slurry casted) with an electronically conductive material that provide an electron conductive path and/or a polymeric binder material that improves the structural integrity of the negative electrode 22. For example, the negative electrode 22 may include greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder.

Electronically conducting materials may include carbon-based materials, powdered nickel or other metal particles, or a conductive polymer. Carbon-based materials may include, for example, particles of graphite, acetylene black (such as KETCHEN™ black or DENKA™ black), carbon nanofibers and nanotubes (e.g., single wall carbon nanotubes (SWCNT), multiwall carbon nanotubes (MWCNT)), graphene (e.g., graphene platelets (GNP), oxidized graphene platelets), conductive carbon blacks (such as, SuperP (SP)), and the like. Examples of a conductive polymer include polyaniline, polythiophene, polyacetylene, polypyrrole, and the like. The polymeric binder in the negative electrode may be the same as or different from the polymeric binder in the solid-state electrolyte layer 26

As illustrated, the positive electrode 24 may be defined by a plurality of positive solid-state electroactive particles 60. In certain instances, as illustrated, the positive electrode may be a composite layer including, for example, the positive solid-state electroactive particles 60 and a third plurality of solid-state electrolyte particles 92. For example, the positive electrode 24 may include greater than or equal to about 30 wt. % to less than or equal to about 98 wt. %, and in certain aspects, optionally greater than or equal to about 50 wt. % to less than or equal to about 95 wt. %, of the positive solid-state electroactive particles 60; and greater than or equal to about 0 wt. % to less than or equal to about 50 wt. %, and in certain aspects, optionally greater than or equal to about 5 wt. % to less than or equal to about 20 wt. %, of the third plurality of solid-state electrolyte particles 92. In each variation, the positive electrode 24 may have a thickness greater than or equal to about 10 μm to less than or equal to about 400 μm, and in certain aspects, optionally greater than or equal to about 30 μm to less than or equal to about 200 μm.

Figure 2:
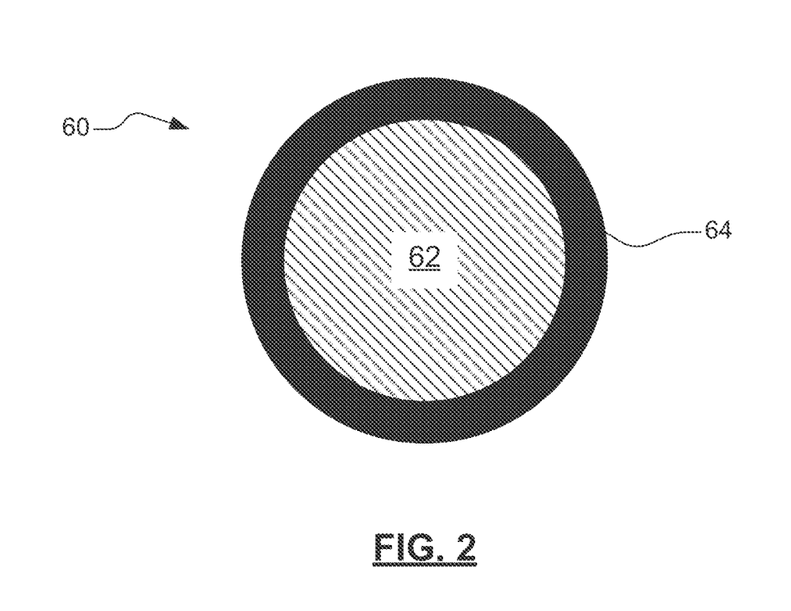
FIG. 2 is an illustration of an example positive solid-state electroactive material particle have one or more coatings in accordance with various aspects of the present disclosure.

The third plurality of solid-state electrolyte particles 92 may be the same as or different from the first plurality of solid-state electrolyte particles 30 and/or the second plurality of solid-state electrolyte particles 90. In certain variations, the positive solid-state electroactive particles 60 may include a nickel rich material represented, for example, by $LiNi_{(1-x-y-z)}Co_xMn_yAl_zO_2$. As illustrated in FIG. 2, the nickel rich material may have a heterogeneous structure including, for example, a nickel-cobalt-manganese (NMC) core 62 and a nickel-cobalt-aluminum (NCA) shell 64 that at least partially coats the nickel-cobalt-manganese (NMC) core 62. For example, the nickel-cobalt-aluminum (NCA) shell 64 may cover greater than or equal to about 60% to less than or equal to about 100%, and in certain aspects, optionally greater than or equal to about 80% to less than or equal to about 100%, of a total exposed surface area of the nickel-cobalt-manganese (NMC) core 62. The nickel-cobalt-manganese (NMC) core 62 may provide high reversible capacity, and also, a high operating potential (e.g., of about 3.6 V), while the nickel-cobalt-aluminum (NCA) shell 64 may help to reduce volume changes during deintercalation, thereby enhancing the structural stability of the positive electrode.

In various aspects, the a nickel-cobalt-manganese (NMC) core 62 may be represented, for example, by $LiNi_{(1-x'-(y/a)}Co_{x'}Mn_{(y/a)}O_2$, and the nickel-cobalt-aluminum (NCA) shell 64 may be represented, for example, by $LiNi_{(1-x''-(z/b)}Co_{x''}Al_{(z/b)}O_2$, where (i) 1−x−y−z>0.5, (ii) a+b=1, (iii) zx'+bx''=x, and (iv) 1−x'−(y/a)>1−x''−(z/b). By way of example, in one variation, the nickel rich material may include $LiNi_{0.88}Co_{0.04}Mn_{0.05}Al_{0.02}O_2$, where the core 62 includes 0.8 $LiNi_{0.8975}Co_{0.04}Mn_{0.0625}O_2$ and the shell 64 includes 0.2 $LiNi_{0.81}Co_{0.04}Al_{0.15}O_2$. In each instance, the nickel-cobalt-manganese (NMC) core 62 may have a particle size greater than or equal to about 0.1 μm to less than or equal to about 50 μm, and in certain aspects, optionally greater than or equal to about 0.5 μm to less than or equal to about 10 μm; and the nickel-cobalt-aluminum (NCA) shell 64 may have an average thickness greater than or equal to about 0.1 μm to less than or equal to about 10 μm, and in certain aspects, greater than or equal to about 0.1 μm to less than or equal to about 1 μm. A mass ratio of the nickel-cobalt-manganese (NMC) core 63 to the nickel-cobalt-aluminum (NCA) shell 64 may be greater than or equal to about 1:99 to less than or equal to about 99:1, and in certain aspects, optionally greater than or equal to about 10:90 to less than or equal to about 90:10.

Figure 3:
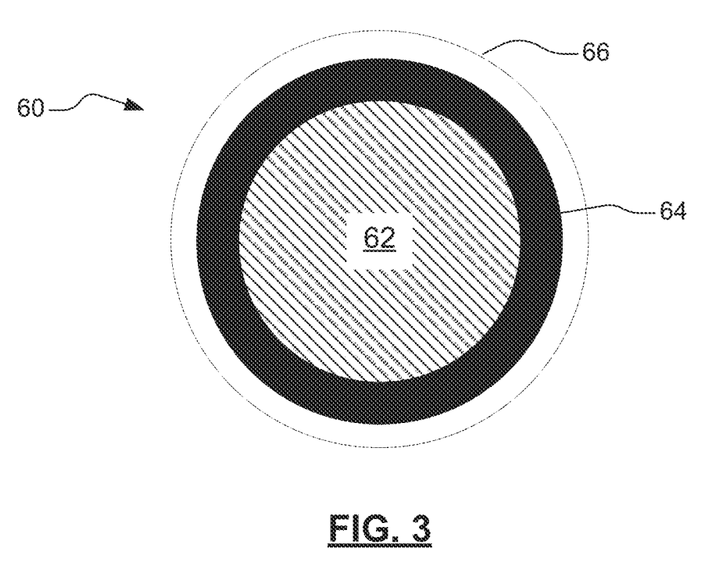
FIG. 3 is an illustration of another example positive solid-state electroactive material particle have one or more coatings in accordance with various aspects of the present disclosure.

In certain instances, as illustrated in FIG. 3, the heterogeneous structure may further include a buffer layer 66 that at least partially coats the nickel-cobalt-aluminum (NCA)

shell 64. For example, the heterogeneous structure may include greater than or equal to about 1 wt. % to less than or equal to about 99 wt. %, and in certain aspects, optionally greater than or equal to about 10 wt. % to less than or equal to about 90 wt. %, of the nickel-cobalt-manganese (NMC) core 62; greater than or equal to about 1 wt. % to less than or equal to about 99 wt. %, and in certain aspects, optionally greater than or equal to about 10 wt. % to less than or equal to about 90 wt. %, of the nickel-cobalt-aluminum (NCA) shell 6; and greater than or equal to about 0 wt. % to less than or equal to about 20 wt. %, and in certain aspects, optionally greater than or equal to about 0.1 wt. % to less than or equal to about 20 wt. %, of the buffer layer.

The buffer layer 66 may cover greater than or equal to about 50% to less than or equal to about 100%, and in certain aspects, optionally greater than or equal to about 80% to less than or equal to about 100%, of a total exposed surface area of the nickel-cobalt-aluminum (NCA) shell 64. The buffer layer 66 may have an average thickness greater than or equal to about 0.001 μm to less than or equal to about 1 μm, and in certain aspects, optionally greater than or equal to about 0.001 μm to less than or equal to about 0.5 μm. The buffer layer 66 may include, for example, $LiNbO_3$, $Li_3PO_4$, $LiAlO_2$, $Al_2O_3$, $LiTaO_3$, $Li_4Ti_5O_{12}$, $Li_2SiO_3$, $Li_3BO_3$, $LiH_2PO_4$, $LiTi_2(PO_4)_3$, $LiPO_3$, $Li_2ZrO_3$, and combinations thereof. The buffer layer may help to further inhibit interfacial reactions and stabilize the interface structure between the positive solid-state electroactive material particles 60 and the solid-state electrolyte particles 92, and in particular, sulfide-based solid-state electrolyte particles.

With renewed reference to FIG. 1, although not illustrated it should be recognized that, in certain variations, the positive solid-state electroactive material particles 60 (and the optional third plurality of solid-state electrolyte particles 92) may be intermingled (e.g., slurry casted) with an electronically conductive material that provide an electron conductive path and/or a polymeric binder material that improves the structural integrity of the positive electrode 24. For example, the positive electrode 24 may include greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder.

Figure 4:
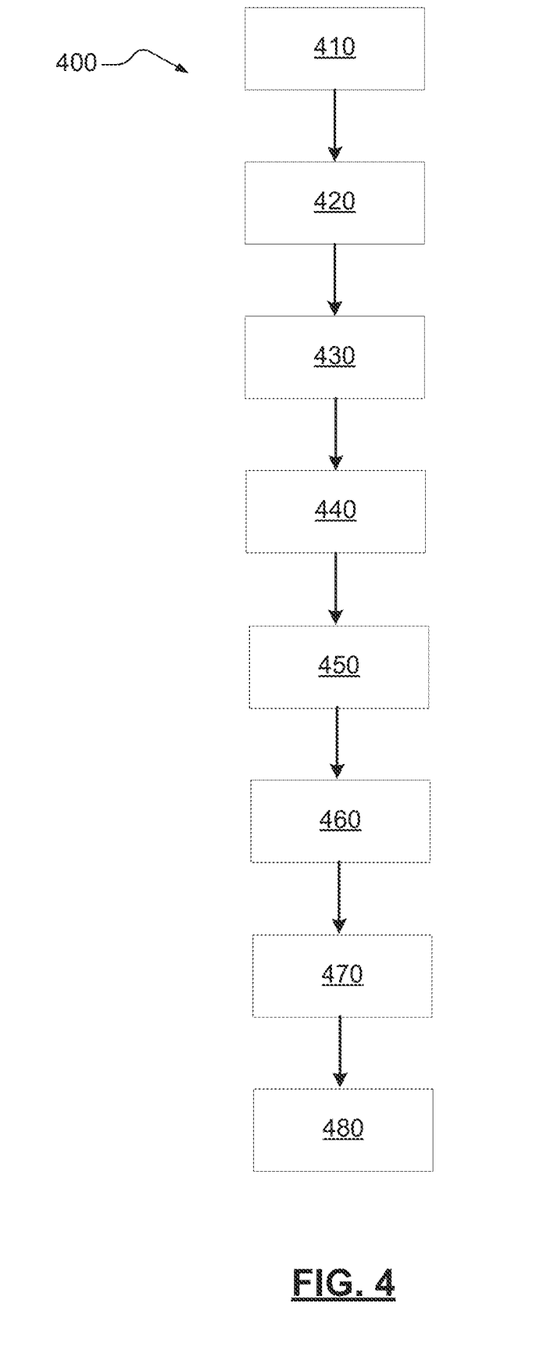
FIG. 4 is a flowchart illustrating an example method for forming positive solid-state electroactive material particle have one or more coatings in accordance with various aspects of the present disclosure.

In various aspects, the present disclosure provides methods for preparing positive solid-state electroactive material particles including nickel-cobalt-manganese (NMC) cores and nickel-cobalt-aluminum (NCA) shells that at least partially coats the nickel-cobalt-manganese (NMC) cores. For example, FIG. 4 illustrates an example method 400 for forming a positive solid-state electroactive material like the positive solid-state electroactive material illustrated in FIG. 2. The method 400 includes contacting 410 a core solution and a mixed solution, for example, a mixed solution of NaOH (e.g., about 10 mol/L) and $NH_3·H_2O$ (e.g., about 0.2 mol/L), to form a first mixture. The core solution includes a mixture of nickel ions ($Ni^{2+}$), cobalt ions ($Co^{2+}$), and manganese ions ($Mn^{2+}$). For example, in certain variations, the core solution may include for example as mass ratio of $Ni^{2+}:Co^{2+}:Mn^{2+}$ of about 89.75:4:6.25. The mixed solution is an aqueous solution including, for example, as noted above, sodium hydroxide (NaOH) and $NH_3·H_2O$. The mixed solution may be used as a precipitation, pH regulator, and complexing agent. In certain variations, the core solution and the mixed solution may be contacted in a water bath and stirring or circulating the water bath.

The method 400 may further include contacting 420 a first shell solution to the first mixture. For example, the first shell solution may be added to a water bath to the first mixture. The first shell solution may include an aqueous mixture of nickel ions ($Ni^{2+}$) and cobalt ions ($CO^{2+}$). For example, in certain variations, the first shell solution may include a mass ratio of $Ni^{2+}:Co^{2+}$ of about 81:4. The method may also further include contacting 430 a second shelf solution to the first mixture. For example, the second shell solution may be added to a water bath that includes the first mixture. The first mixture together with the first shell solution and the second shell solution defines a second mixture. The second shell solution may be contacted to the first mixture at the simultaneously or concurrently with the first shell solution. In certain variations, the second shell solution may be an aqueous solution including sodium aluminate ($NaAlO_2$), sodium hydroxide (NaOH), and $NH_3·H_2O$ In each variation, the method 400 further includes removing 440, for example, precipitating, a precursor electroactive material from the second mixture. The method 400 may further include contacting 450 the isolated precursor electroactive material with a basic solid to form a third mixture. The basic solid may be, for example, $LiOH·H_2O$. The method 400 may further include calcining 460 the third mixture, for example, in the present of oxygen, to form the positive solid-state electroactive material particles including nickel-cobalt-manganese (NMC) cores and nickel-cobalt-aluminum (NCA) shells. In certain variations, the calcining 460 may include heating the third mixture to a temperature greater than or equal to about 500° C. to less than or equal to about 900° C., and in certain aspects, optionally greater than or equal to about 600° C. to less than or equal to about 800° C.

In certain variations, to form positive solid-state electroactive material particles that further include buffer layers that at least coats the nickel-cobalt-aluminum (NCA) shells, the method 400 further includes contacting 470 the positive solid-state electroactive material particles including nickel-cobalt-manganese (NMC) cores and nickel-cobalt-aluminum (NCA) shells with a buffer solution to form a fourth mixture, and calcining 480 the fourth mixture to form the positive solid-state electroactive material particles that include buffer layers that at least coats the nickel-cobalt-aluminum (NCA) shells. The buffer solution may include, for example, $Nb(C_2H_5O)_5$, $C_2H_5OH$, and/or lithium. In certain variations, the calcining 480 may include heating the third mixture to a temperature greater than or equal to about 200° C. to less than or equal to about 500° C., and in certain aspects, optionally greater than or equal to about 300° C. to less than or equal to about 500° C.

Certain features of the current technology are further illustrated in the following non-limiting examples.

Example 1

Figure 5A:
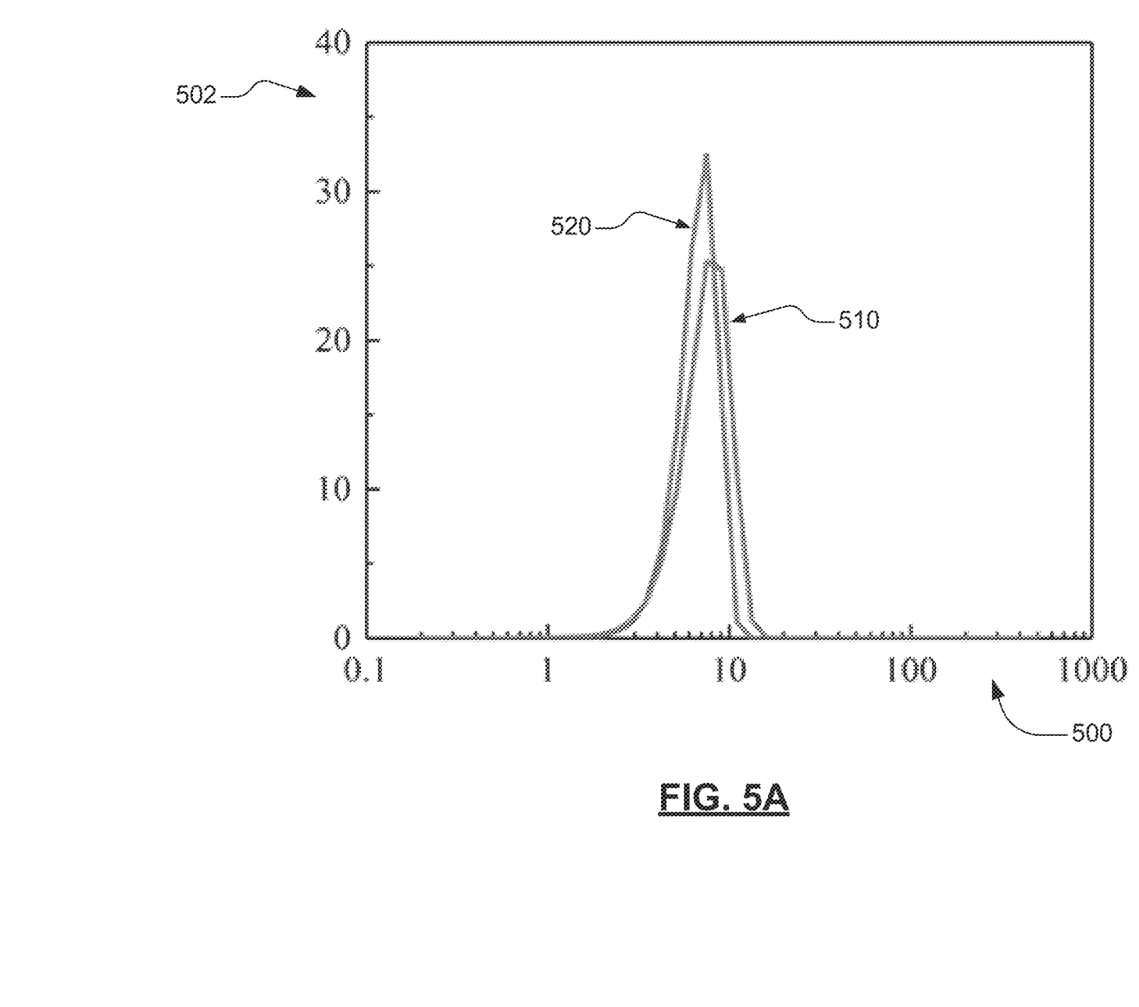
FIG. 5A is a graphical illustration comparing the particle size distributions of as-prepared example positive solid-state electroactive material particles having heterogeneous structures including one or more coatings in accordance with various aspects of the present disclosure to comparative positive solid-state electroactive material particles having homogeneous structures that omit shells or coatings.
Figure 5B:
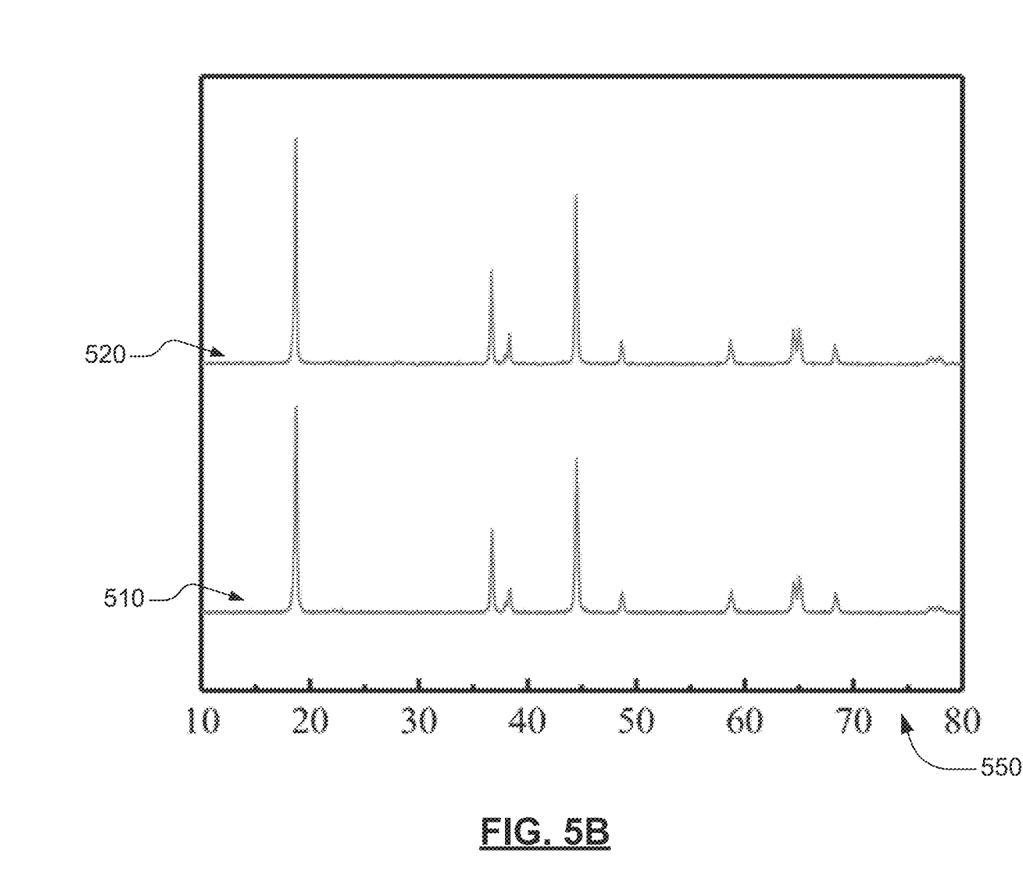
FIG. 5B is a graphical illustration comparing x-ray diffractions of as-prepared example positive solid-state electroactive material particles having heterogeneous structures including one or more coatings in accordance with various aspects of the present disclosure to comparative positive solid-state electroactive material particles having homogeneous structures that omit shells or coatings.

Example positive solid-state electroactive materials may be prepared in accordance with various aspects of the present disclosure. For example, positive solid-state electroactive material particles 510 having heterogeneous structures including nickel-cobalt-manganese (NMC) cores and nickel-cobalt-aluminum (NCA) shells that at least partially coats the nickel-cobalt-manganese (NMC) cores may be prepared in accordance with various aspect of the present disclosure. Comparative positive solid-state electroactive material particles 520 having homogeneous structures that omit shells or coatings may also be prepared. The comparative positive solid-state electroactive material particles 520 may be prepared in a manner similar to the positive solid-state electroactive material particles 510 where the no shell solution is included.

FIG. 5A is a graphical illustration comparing size distribution of as-prepared example positive solid-state electroactive material particles 510 and as-prepared comparative positive solid-state electroactive material particles 520, where the x-axis 500 represents diameter (μm), and y-axis 502 represents differential distribution (%). As illustrated, example positive solid-state electroactive material particles 510 showed a slight larger particle size than comparative positive solid-state electroactive material particles 520. The following table summarizes the particle size distributions of the example particles 510 and the comparative particles 520.

|     | D10 (μm) | D20 (μm) | D30 (μm) |
| --- | --- | --- | --- |
| 520 | 4.21 | 6.19 | 7.93 |
| 510 | 4.23 | 6.85 | 9.32 |

FIG. 5B is a graphical illustration comparing the x-ray diffraction (XRD) of as-prepared example positive solid-state electroactive material particles 510 and as-prepared comparative positive solid-state electroactive material particles 520, where the x-axis 550 represents 2 theta/deg and the y-axis represents intensity (a.u.). As illustrated, both example positive solid-state electroactive material particles 510 and comparative positive solid-state electroactive material particles 520 can be indexed to a well-defined hexagonal α-NaFeO$_2$ layered structure, and no impurity is observed in the XRD patterns of either material.

Example 2

Example battery cells may be prepared in accordance with various aspects of the present disclosure. For example, an example battery cell 610 including positive solid-state electroactive material particle having heterogeneous structures including nickel-cobalt-manganese (NMC) cores and nickel-cobalt-aluminum (NCA) shells that at least partially coats the nickel-cobalt-manganese (NMC) cores may be prepared in accordance with various aspect of the present disclosure. A comparative battery cell 620 including positive solid-state electroactive material particles having homogeneous structures that omit shells or coatings may also be prepared.

Figure 6:
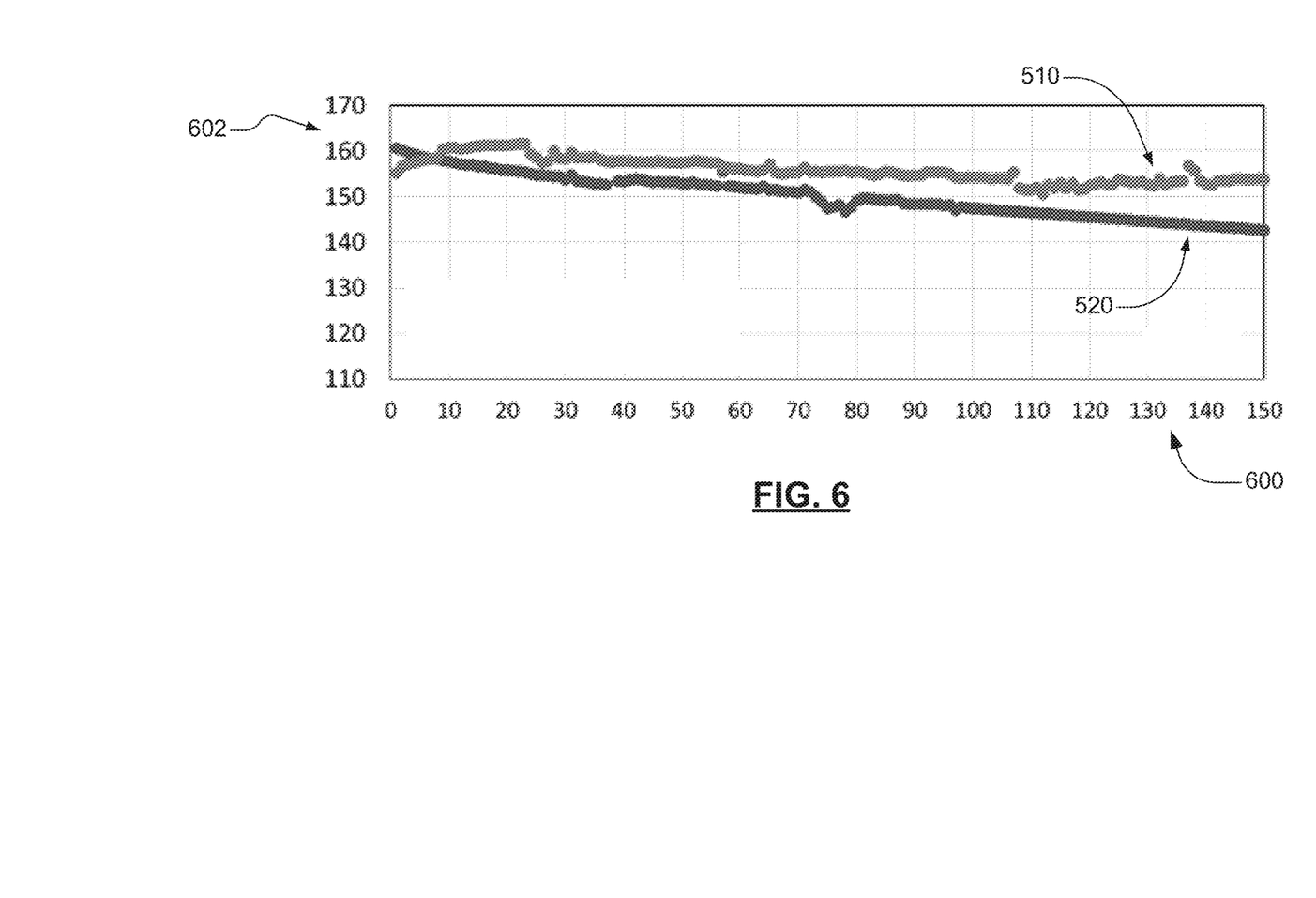
FIG. 6 is a graphical illustration demonstrating the capacity retention of an example battery cell including positive solid-state electroactive material particles having heterogeneous structures including one or more coatings in accordance with various aspects of the present disclosure.

FIG. 6 is a graphical illustration demonstrating capacity retention of the example battery cell 610 as compared to the comparative cell 620, where the x-axis 600 represents cycle number, and the y-axis 602 represents capacity (mAh/g). As illustrated, the example battery cell 610 has improved long term performance. For example, the example battery cell 610 delivered a capacity retention of 99% over 150 cycles, which is higher than that of comparative cell 620 (89%). The example data indicates that the positive solid-state electroactive material particle having heterogeneous structures including nickel-cobalt-manganese (NMC) cores and nickel-cobalt-aluminum (NCA) shells can enable a more compatible and more stable interface with solid electrolyte as compared to positive solid-state electroactive material particle having homogeneous structures.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A positive electroactive material for an electrochemical cell that cycles lithium ions, the positive electroactive material comprising:
   a nickel-rich material represented by $LiNi_{(1-x-y-z)}Co_xMn_yAl_zO_2$ and comprising a plurality of solid-state particles, each solid-state particle having a heterogeneous structure comprising:
   a core comprising a nickel-cobalt-manganese material represented by $LiNi_{(1-x''-(y/a))}Co_x''Mn_{(y/a)}O_2$; and
   a shell at least partially coating the core and comprising a nickel-cobalt-aluminum material represented by $LiNi_{(1-x''-(z/b))}Co_x''Al_{(z/b)}O_2$, where (i) 1−x−y−z>0.5, (ii) a+b=1, (iii) zx''+bx''=x, and (iv) 1−x''−(y/a)>1−x''−(z/b).

2. The positive electroactive material of claim 1, wherein the nickel-rich material comprises $LiNi_{0.88}Co_{0.04}Mn_{0.05}Al_{0.02}$, the nickel-cobalt-manganese material comprises 0.8 $LiNi_{0.8975}Co_{0.04}Mn_{0.0625}O_2$, and the nickel-cobalt-aluminum material comprises 0.2 $LiNi_{0.81}Co_{0.04}Al_{0.15}O_2$.

3. The positive electroactive material of claim 1, wherein the shell covers greater than or equal to about 80% to less than or equal to about 100% of an exposed surface of the core.

4. The positive electroactive material of claim 1, wherein a mass ratio of the core to the shell is greater than or equal to about 1:99 to less than or equal to about 99:1.

5. The positive electroactive material of claim 1, wherein the core has a particle size greater than or equal to about 0.1 micrometers to less than or equal to about 50 micrometers, and the shell has an average thickness greater than or equal to about 0.01 micrometers to less than or equal to about 10 micrometers.

6. The positive electroactive material of claim 1, the core and the shell define a base structure and the heterogeneous structure further comprises a buffer layer that at least partially coats the base structure.

7. The positive electroactive material of claim 6, wherein the buffer layer covers greater than or equal to about 50% to less than or equal to about 100% of the base structure.

8. The positive electroactive material of claim 6, wherein the buffer layer has an average thickness greater than or equal to about 0.001 micrometers to less than or equal to about 1 micrometers.

9. The positive electroactive material of claim 6, wherein the buffer layer comprises a material selected from the group consisting of: $LiNbO_3$, $Li_3PO_4$, $LiAlO_2$, $Al_2O_3$, $LiTaO_3$, $Li_4Ti_5O_{12}$, $Li_2SiO_3$, $Li_3BO_3$, $LiH_2PO_4$, $LiTi_2(PO_4)_3$, $LiPO_3$, $Li_2ZrO_3$, and combinations thereof.

10. An all-solid-state electrochemical cell that cycles lithium ions, the all-solid-state electrochemical cell comprising:
   a positive electrode comprising:
   sulfide-based solid-state electrolyte; and
   a nickel-rich material represented by $LiNi_{(1-x-y-z)}Co_xMnyAl_zO_2$ and comprising a plurality of solid-state electroactive material particles, each solid-state particle having a heterogeneous structure comprising:

a core comprising a nickel-cobalt-manganese material represented by $LiNi_{(1-x''-(y/a))}Co_x''Mn_{(y/a)}O_2$; and a shell at least partially coating the core and comprising a nickel-cobalt-aluminum material represented by $LiNi_{(1-x''-(z/b))}Co_x''Al_{(z/b)}O_2$, where (i) 1−x−y−z>0.5, (ii) a+b=1, (iii) zx"+bx"=x, and (iv) 1−x"−(y/a)>1−x"−(z/b).

11. The all-solid-state electrochemical cell of claim 10, wherein a mass ratio of the core to the shell is greater than or equal to about 1:99 to less than or equal to about 99:1, the shell covering greater than or equal to about 60% to less than or equal to about 100% of an exposed surface of the core.

12. The all-solid-state electrochemical cell of claim 10, wherein the core and the shell define a base structure and the heterogeneous structure further comprises a buffer layer that at least partially coats the base structure.

13. The all-solid-state electrochemical cell of claim 12, wherein the buffer layer covers greater than or equal to about 50% to less than or equal to about 100% of the base structure.

14. The all-solid-state electrochemical cell of claim 13, wherein the buffer layer comprises a material selected from the group consisting of: $LiNbO_3$, $Li_3PO_4$, $LiAlO_2$, $Al_2O_3$, $LiTaO_3$, $Li_4Ti_5O_{12}$, $Li_2SiO_3$, $Li_3BO_3$, $LiH_2PO_4$, $LiTi_2(PO_4)_3$, $LiPO_3$, $Li_2ZrO_3$, and combinations thereof.

15. A solid-state positive electrode for an electrochemical cell that cycles lithium ions, the solid-state positive electrode comprising:

a nickel-rich material represented by $LiNi_{(1-x-y-z)}Co_xMn_yAl_zO_2$ and comprising a plurality of solid-state particles, each particle comprising:

a core comprising a nickel-cobalt-manganese material represented by $LiNi_{(1-x''-(y/a))}Co_x'Mn_{(y/a)}O_2$; and a shell comprising a nickel-cobalt-aluminum material represented by $LiNi_{(1-x''-(z/b))}Co_x''Al_{(z/b)}O_2$, where (i) 1−x−y−z>0.5, (ii) a+b=1, (iii) zx'+bx" =x, and (iv) 1−x'−(y/a)>1−x"−(z/b); and a sulfide-based solid-state electrolyte.

16. The solid-state positive electrode of claim 15, at least one particle of the plurality of solid-state particles is coated with a buffer layer.

17. The solid-state positive electrode of claim 16, wherein the buffer layer covers greater than or equal to about 50% to less than or equal to about 100% of exposed surface of the particle.

18. The solid-state positive electrode of claim 16, wherein the buffer layer comprises a material selected from the group consisting of: $LiNbO_3$, $Li_3PO_4$, $LiAlO_2$, $Al_2O_3$, $LiTaO_3$, $Li_4Ti_5O_{12}$, $Li_3SiO_3$, $Li_3BO_3$, $LiH_2PO_4$, $LiTi_2(PO_4)_3$, $LiPO_3$, $Li_2ZrO_3$, and combinations thereof.

* * * * *